(12) United States Patent
Okamura et al.

(10) Patent No.: US 6,776,276 B2
(45) Date of Patent: Aug. 17, 2004

(54) WET FRICTION MATERIAL AND ITS MANUFACTURING METHOD

(75) Inventors: Hiroki Okamura, Nagoya (JP); Masato Suzuki, Toyota (JP); Yoshihito Fujimaki, Aichi-ken (JP)

(73) Assignee: Aisin Kako Kabushiki Kaisha, Nishikamo-Gun (JP)

( * ) Notice: Subject to any disclaimer, the term of this patent is extended or adjusted under 35 U.S.C. 154(b) by 0 days.

(21) Appl. No.: 10/280,088

(22) Filed: Oct. 25, 2002

(65) Prior Publication Data

US 2003/0079653 A1 May 1, 2003

(30) Foreign Application Priority Data

Oct. 26, 2001 (JP) .............................. 2001-329008

(51) Int. Cl.⁷ .............................................. B32B 3/02
(52) U.S. Cl. ............................... 192/107 M; 428/66.2
(58) Field of Search ..................... 428/66.2; 192/107 M

(56) References Cited

U.S. PATENT DOCUMENTS 5,823,314 A * 10/1998 Suzuki et al. .......... 192/107 M

FOREIGN PATENT DOCUMENTS

JP 58-189232 * 11/1983
JP 04-78331 3/1992

* cited by examiner

Primary Examiner—Alexander S. Thomas
(74) Attorney, Agent, or Firm—Westerman, Hattori, Daniels & Adrian, LLP

(57) ABSTRACT

A wet friction material and its manufacturing method are provided. The wet friction material has a substrate having a surface and a very superficial layer. The very superficial layer is provided on the surface of the substrate and contains resin and fibers. The resin and the fibers are heated by one of a laser beam, a heating plate and a heating roller so as to thermally change the very superficial layer in a short period of time. Such manufacturing method is capable of evenly carbonizing the resin and the fibers of the very superficial layer of a friction surface of the wet friction material so as to flexibly deal with a variety of size of products.

14 Claims, 5 Drawing Sheets

WET FRICTION MATERIAL AND ITS MANUFACTURING METHOD

BACKGROUND OF THE INVENTION

1. Field of the Invention

This invention relates to a wet friction material used for an automatic transmission and the like and its manufacturing method.

2. Description of the Related Art

A wet friction material is used for an automatic transmission of an automobile and the like. The wet friction material has a basic structure in which a lining of high coefficient of friction is stuck on a surface of an annular core metal. A positive $\mu$-V slope is required for the wet friction material so that a slippage ($\mu$) increases as a relative revolution (V) to a counterpart material increases. In order to improve the positive $\mu$-V slope, it is effective to contact a carbonized and inorganic surface layer with the counterpart material. Conventionally, several methods have been used such as a resin component at a very superficial layer of the wet friction material is mechanically abraded by use of a special jig so as to facilitate mixed inorganic component to be contacted with the counterpart material. A technique shown in Japanese Laid Open Patent Application No. 4-78331 relates to such method.

However, in case of the mechanical abrasion method using the special jig, special jigs are necessary for every size of products, respectively, thereby increasing production costs. It is possible to burn the very superficial layer. However, it affects irregularity of the friction surface, so that it takes much time to carbonize the surface layer and that there are generated irregularity or unevenness.

BRIEF SUMMARY OF THE INVENTION

An object of the present invention is to provide an efficient and economic wet friction material and its manufacturing method that is capable of evenly carbonizing resin and fibers of a very superficial layer of a friction surface so as to flexibly deal with a variety of size of products.

According to a first aspect of the invention, there is provided a wet friction material comprising a substrate having a surface. A very superficial layer is provided on the surface of the substrate and contains resin and fibers. The resin and the fibers are heated by one of a laser beam, a heating plate and a heating roller so as to thermally change the very superficial layer in a short period of time.

According to a second aspect of the invention, there is provided a manufacturing method of a wet friction material comprising the step of heating resin and fibers contained in a very superficial layer provided on a surface of a substrate by one of a laser beam, a heating plate and a heating roller so as to thermally change the very superficial layer in a short period of time.

In each of the above aspects of the invention, the thermal change of the very superficial layer may comprise carbonizing the very superficial layer within a range of about 15 to 80 $\mu$m in thickness from a surface of the very superficial layer. Alternatively, the thermal change of the very superficial layer may comprise quenching and hardening the very superficial layer within a range of about 15 to 80 $\mu$m in thickness from a surface of the very superficial layer.

Moreover, the wet friction material may have a disk shape. The resin and the fibers may be heated by the laser beam so as to carbonize the very superficial layer, and the laser beam may be radiated on the surface of the very superficial layer from one of one circumference to another circumference while rotating the wet friction material on a rotating table under a laser radiation power of 30–90% and a table rotating speed of 20 to 40 rpm.

Further objects and advantages of the invention will be apparent from the following description, reference being had to the accompanying drawings, wherein preferred embodiments of the invention are clearly shown.

DETAILED DESCRIPTION OF THE INVENTION

Several embodiments of the invention are described hereunder referring to the attached drawings.

First Embodiment

Figure 1:
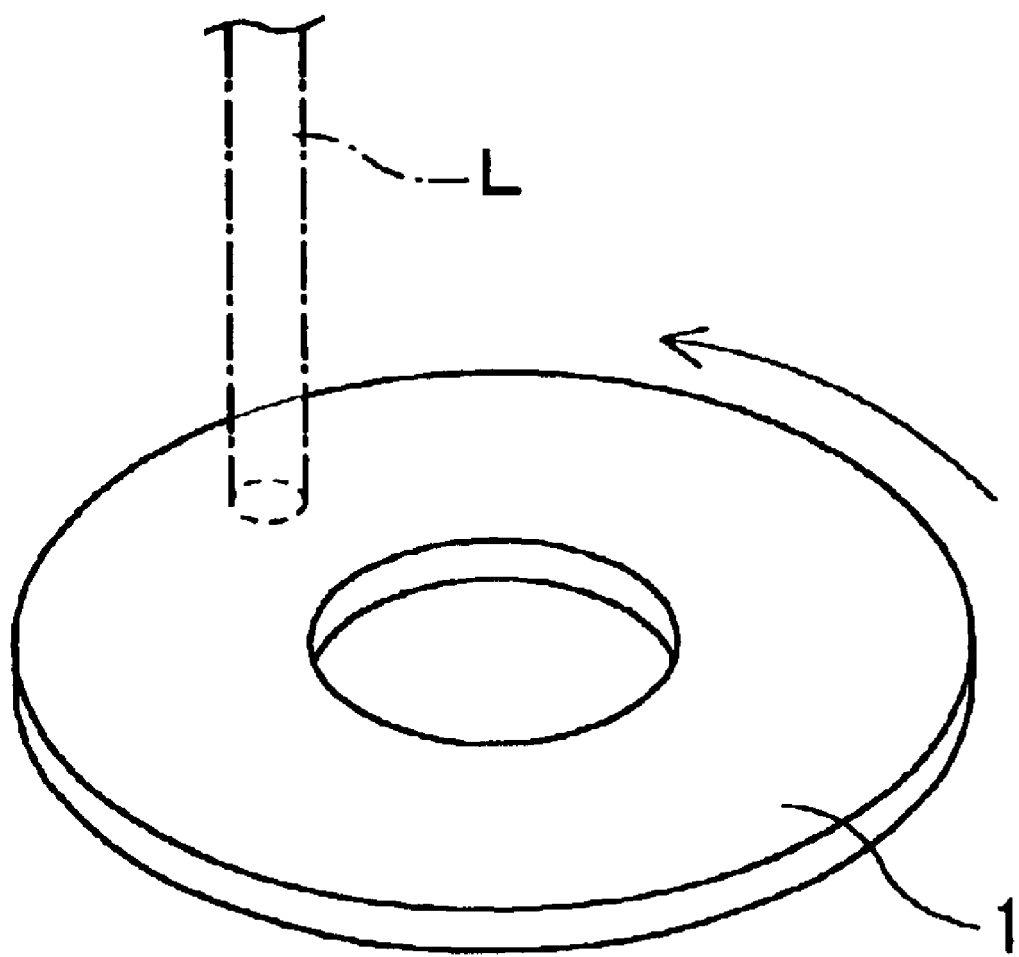
FIG. 1 is a perspective view schematically showing a manufacturing method of a wet friction material according to a first embodiment of the invention.
Figure 2:
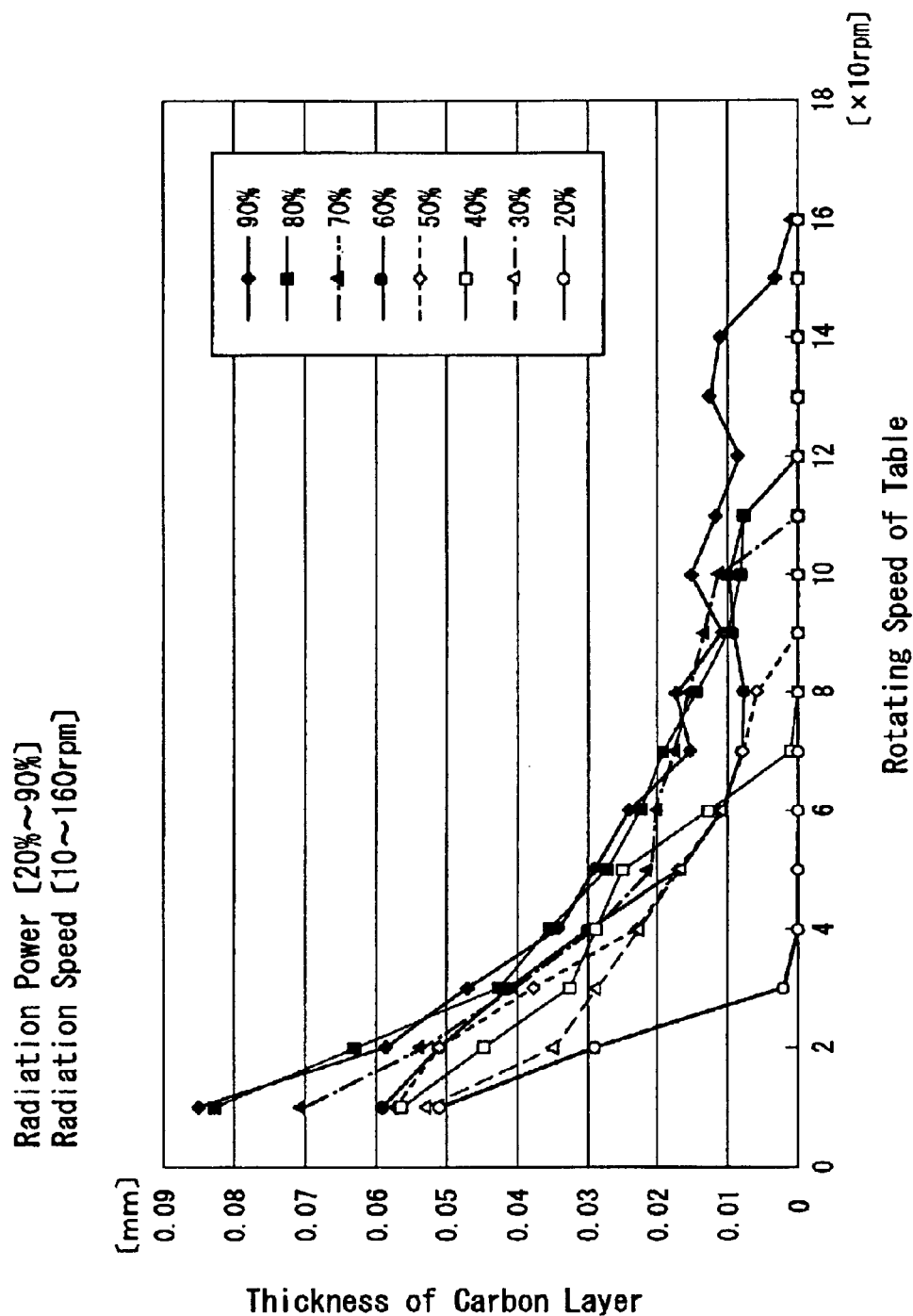
FIG. 2 is a graph showing a relation between a rotation speed of a laser beam radiating table and a formed carbon layer in the wet friction material according to the first embodiment of the invention.
Figure 3:
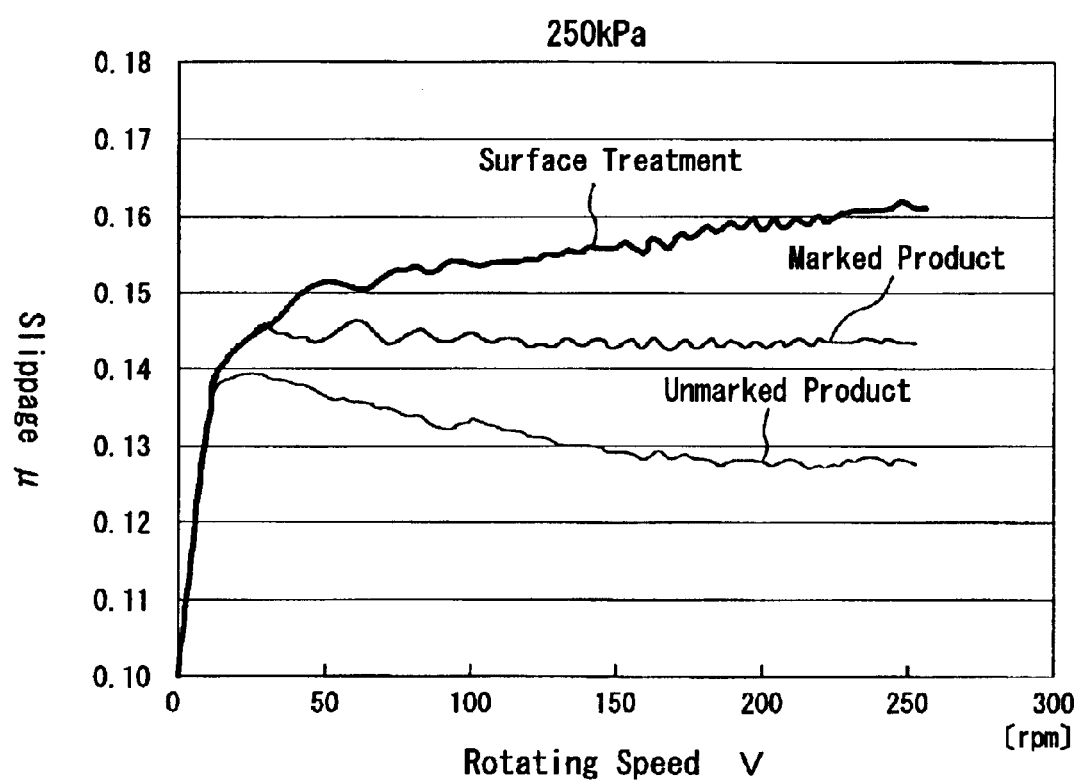
FIG. 3 is a graph showing results of a friction test for the wet friction material according to the first embodiment of the invention together with results of a friction test for the conventional wet friction material.
Figure 4:
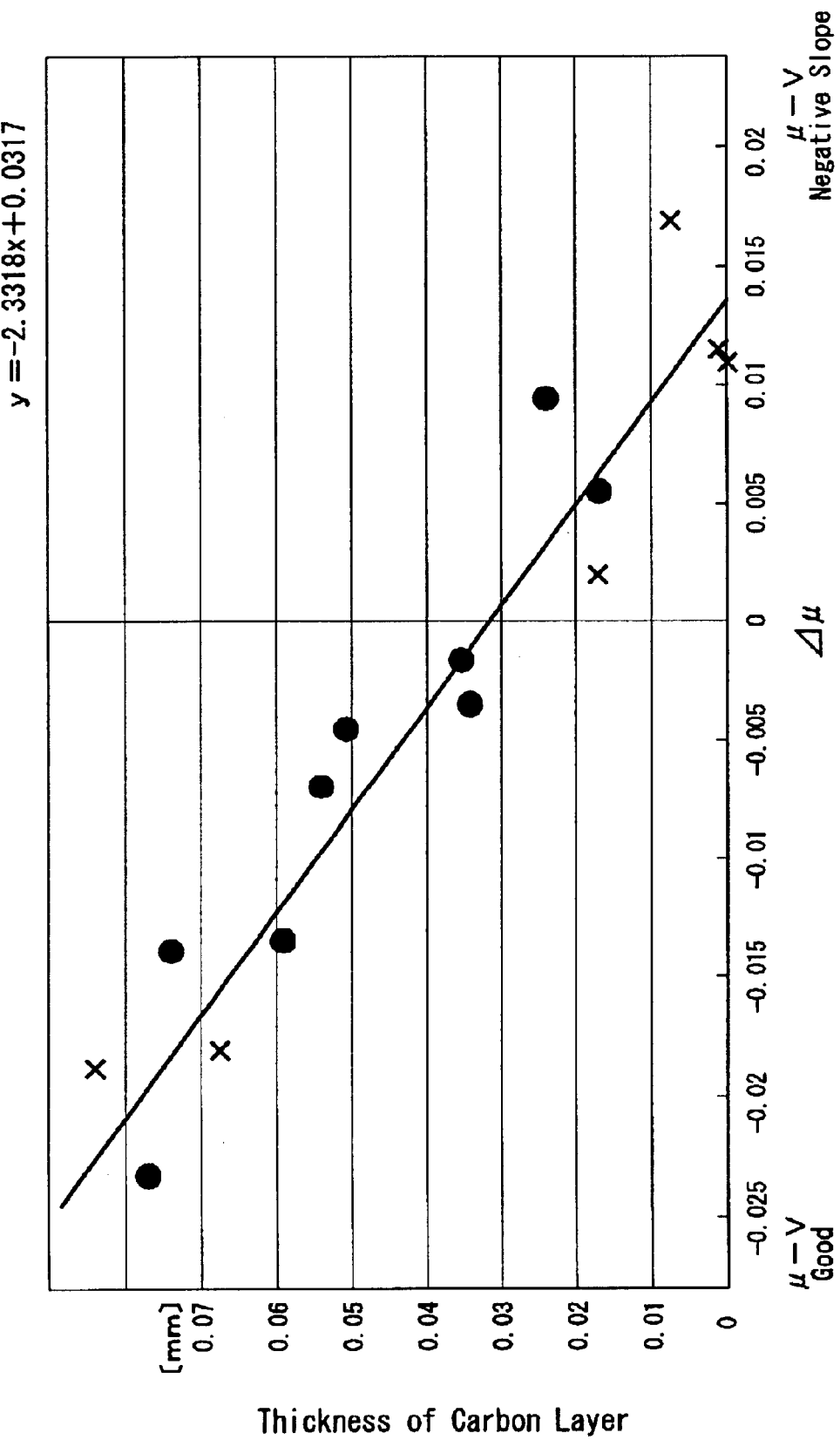
FIG. 4 is a graph showing a relation between a thickness of the carbon layer and $\Delta\mu$ of the wet friction material according to the first embodiment of the invention.

A first embodiment of the invention is described referring to FIG. 1 to FIG. 4. FIG. 1 is a perspective view schematically showing a manufacturing method of a wet friction material according to a first embodiment of the invention. FIG. 2 is a graph showing a relation between a rotation speed of a laser beam radiating table and a formed carbon layer in the wet friction material according to the first embodiment of the invention. FIG. 3 is a graph showing results of a friction test for the wet friction material according to the first embodiment of the invention together with results of a friction test for the conventional wet friction material. FIG. 4 is a graph showing a relation between a thickness of the carbon layer and $\Delta\mu$ of the wet friction material according to the first embodiment of the invention.

As shown in FIG. 1, a wet friction material 1 of the first embodiment is a ring-shaped member that is secured on a piston inside an automatic transmission. A counterpart member is a front cover. The wet friction material 1 is fixed on a center of a rotation table (not shown) with a friction surface faced upward. Next, a laser beam L of a CO2 (carbon dioxide) laser having a wavelength of 10.6 $\mu$m is conducted to an upper side of the rotation table by an optical system combining a collimator lens, a converging lens, a reflector and so on. Then, the laser beam L is radiated on an outermost circumference of an upper side of the wet friction material 1, while the rotation table is rotated at a fixed rotation speed. The laser beam L is gradually shifted inwardly in a radial direction of the rotation table in accordance with the rotation of the rotation table. When the laser beam L reaches an innermost circumference of the wet friction material 1, the radiation of the laser beam L is stopped. Thus, the laser beam can be radiated on the entire friction surface of the wet friction material 1 with constant intensity. Consequently, resin and fibers existing in the very superficial layer of the wet friction material 1 can be carbonized in constant thickness and depth.

Moreover, such method can deal with any size of wet friction materials, so that it is unnecessary to prepare special jigs for every size to mechanically abrading the very superficial layer of the wet friction material. Consequently, the very superficial layer of the wet friction material can be carbonized very economically.

Relation between a rotating speed of the rotation table and a radiation power of the laser beam L and a thickness of a formed carbon layer is described referring to FIG. 2. The test was carried out while the radiation power of the CO2 laser is varied every 10% from 90% to 20% and the rotating speed of the table is varied every 10 rmp from 10 rpm to 160 rpm for each of the radiation powers. As predicted, if the radiation power of the CO2 laser is higher or the rotating speed of the table is lower, the formed carbon layer becomes thicker. In case the rotating speed of the table is 10 rpm, a carbon layer of about 50 $\mu$m is formed even though the radiation power is 20%. Where the radiation power becomes 90%, a carbon layer of about 85 $\mu$m is formed. In case the rotating speed of the table is 20 rpm, a carbon layer of about 30 $\mu$m to 60 $\mu$m is formed according to the radiation power. Where the rotating speed becomes 80 rpm, the thickness of the carbon layer becomes thin such as 0 to about 18 $\mu$m. In case the rotating speed of the table is 160 rpm, no carbon layer is formed even if the radiation power is raised to 90%. Thus, a variety of thicknesses of carbon layers can be formed depending on a radiating condition of the laser beam L.

Relation between the thickness of the carbon layer and $\Delta\mu$ and the positive $\mu V$ slope is described referring to FIG. 3 and FIG. 4. FIG. 3 shows results of friction tests under the same conditions for a wet friction material formed with a carbon layer of a fixed thickness (a surface treatment), a wet friction material treated with the conventional mechanical abrasion technique (marked product) and a wet friction material without any treatment (unmarked product).

As shown in FIG. 3, in case of the unmarked product, a value of slippage $\mu$ gradually decreases as the rotating speed V increases. That is, it shows a negative slope. In case of the marked product, the value of slippage $\mu$ scarcely change even if the rotating speed V increases. To the contrary, in case of the surface treatment, the value of slippage $\mu$ gradually increases as the rotating speed V increases, thereby showing a positive $\mu$-V slope. Thus, it is understood that, if the laser beam is radiated on the resin an fibers existing in the very superficial layer of the wet friction material, a good wet friction material is obtained showing the positive $\mu$-V slope. As a result of such friction test, waveforms are obtained as shown in FIG. 3. A value of $\Delta\mu$ having a close relationship with the positive $\mu$-V slope is calculated from the waveforms.

Relation between the value of $\Delta\mu$ and the thickness of the carbon layer shown in FIG. 2 is speculated referring to FIG. 4. As shown in FIG. 4, in case the thickness of the carbon layer is about 35 $\mu$m or more, $\Delta\mu$ has a negative value, thereby showing a good positive $\mu$-V slope. To the contrary, in case the thickness of the carbon layer is about 25 $\mu$m or less, $\Delta\mu$ has a positive value, thereby showing a negative $\mu$-V slope. Data of ● shows a case that did not generate a judder phenomenon that the wet friction material vibrates. Data of X shows a case that generated the judder phenomenon. In case the thickness of the carbon layer is about 35 $\mu$m or more, the judder phenomenon does not occur. In case the thickness of the carbon layer is about 25 $\mu$m or less, the judder phenomenon occurs.

The results of these friction tests are correlated by the method of least square. In case the thickness of the carbon layer is about 35 $\mu$m or more, the data are concentrated near the straight line. As the thickness of the carbon layer becomes larger, the negative value of $\Delta\mu$ increases, thereby showing a better positive $\mu$-V slope. In contrast, in case the thickness of the carbon layer is about 25 $\mu$m or less, the data are distributed without relation with the straight line and there is no relation founded by the method of least square. Accordingly, in order to obtain a better positive $\mu$-V slope, it is necessary to make the thickness of the carbon layer larger (about 35 $\mu$m or more) that is formed on the friction surface of the wet friction material by the laser beam. However, if the thickness of the carbon layer becomes about 60 $\mu$m or more, it is possible that the carbonized layer of the resin and fibers of the very superficial layer of the friction surface is separated from a substrate and flakes away. Therefore, it is preferable to carbonize within a thickness range of about 35 to 60 $\mu$m from the surface so as to keep a portion at which the resin and fibers of the very superficial layer is entangled with the substrate and obtain a positive $\mu$-V slope.

Specifically, as read out from the data of FIG. 2, if the laser beam is radiated within a range of the laser radiation power of 30 to 90% and the table rotating speed of 20 to 40 rpm, a target thickness of carbon layer is obtained.

While the first embodiment shows an example using the CO2 laser as a laser beam source for carbonizing the friction surface of the wet friction material, any source may be used as long as it is a laser source that has a heating capacity for carbonizing the friction surface.

According to the experiment by the inventors, it is preferable to carbonize within the thickness range of about 35 to 60 $\mu$m from the surface so as to keep the portion at which the resin and fibers of the very superficial layer is entangled with the substrate and obtain the positive $\mu$-V slope. Still, when further examining a usable limitation, if the thickness is smaller than about 35 $\mu$m, the positive $\mu$-V slope characteristic is lowered. If the thickness is smaller than about 15 $\mu$m, it is difficult to put into practice. Where the thickness is larger than about 60 $\mu$m, it is possible that the carbonized layer of the resin and fibers of the very superficial layer of the friction surface is separated from the substrate. If the thickness is larger than about 80 $\mu$m, the carbonized layer of the very superficial layer is flaked off. As a result, it was confirmed that the wet friction material having the carbonized layer of the resin and fibers within a thickness of about 15 to 80 $\mu$m from the surface is usable.

Second Embodiment

Figure 5:
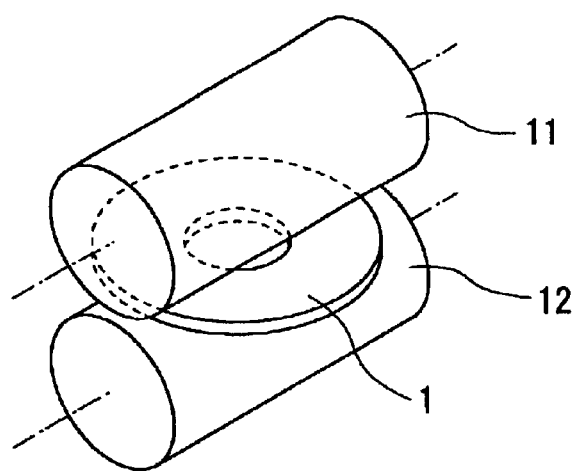
FIG. 5 is a perspective view schematically showing a manufacturing method of a wet friction material according to a second embodiment of the invention.

A second embodiment of the invention is described referring to FIG. 5. FIG. 5 is a perspective view schematically showing a manufacturing method of a wet friction material according to a second embodiment of the invention.

In FIG. 5, a heating roller 11 has an outside surface heated up to 800 to 1000° C. by a heater housed inside. A follower roller 12 is a roller that has no heater and the like inside and that only rotates passively or actively. The heating roller 11 and the follower roller 12 rotate at the same speed while interposing the wet friction material 1 therebetween. Alternatively, the heating roller 11 rotates at a fixed speed and the follower roller 12 rotates according to the rotation of the heating roller 11. The heating roller 11 heats the resin and fibers existing in the very superficial layer of the wet friction material 1 so as to carbonize the very superficial layer in a very short period of time. It is possible to carbonize the resin and fibers existing in the very superficial layer of the wet friction material 1 evenly in a desired thickness by selecting a contacting time and a contacting pressure.

The second embodiment describes the example in which the resin and fibers are evenly carbonized in a desired thickness. However, the inventive wet friction material may be treated so as to change surface property such as quenching and hardening depending on its material.

Thus, it is possible to heat and change the property of the resin and fibers of the very superficial layer of the friction surface including the carbonizing. Consequently, the wet friction material 1 can flexibly deal with a variety of size of products, thereby being efficient and economic.

Third Embodiment

Figure 6:
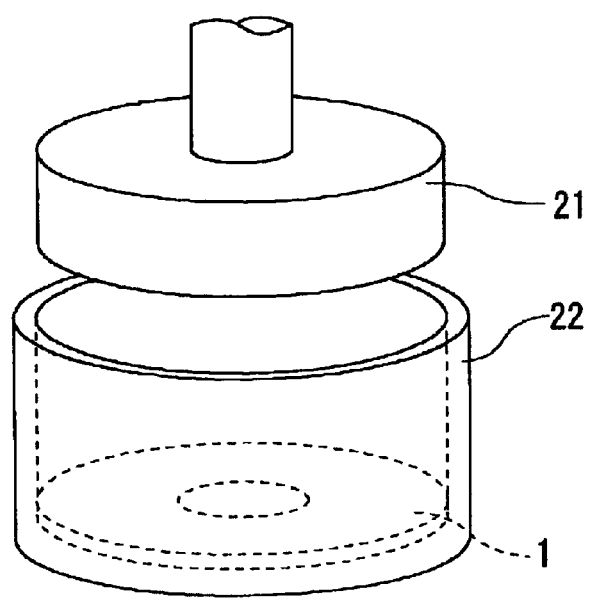
FIG. 6 is a perspective view schematically showing a manufacturing method of a wet friction material according to a third embodiment of the invention.

A third embodiment of the invention is described referring to FIG. 6. FIG. 6 is a perspective view schematically showing a manufacturing method of a wet friction material according to a third embodiment of the invention.

IN FIG. 6, a disk-shaped heating plate 21 has an outside surface heated up to up to 800 to 1000° C. by a heater housed inside. A fixed base 22 accommodates the wet friction material 1 therein. The heating plate 21 presses the wet friction material 1 housed inside the fixed base 22 with a prescribed pressure for a predetermined period of time. The heating plate 21 heats the resin and fibers existing in the very superficial layer of the wet friction layer 1 so as to carbonize the very superficial layer in a very short period of time. It is possible to carbonize the resin and fibers existing in the very superficial layer of the wet friction material 1 evenly in a desired thickness by selecting a contacting time and a contacting pressure.

The third embodiment describes the example in which the resin and fibers are evenly carbonized in a desired thickness. However, the inventive wet friction material may be treated so as to change surface property such as quenching and hardening depending on its material.

Thus, it is possible to heat and change the property of the resin and fibers of the very superficial layer of the friction surface including the carbonizing. Consequently, the wet friction material 1 can flexibly deal with a variety of size of products, thereby being efficient and economic.

Each of the above-mentioned embodiments of the wet friction material 1 is described as a wet friction material for an automatic transmission, for example. The inventive wet friction material and its manufacturing method can be applied to a variety of wet friction materials such as a wet clutch, a brake lining, a lockup clutch lining, a dry clutch lining and a brake band lining.

In each of the above-mentioned embodiments, the resin and fibers existing in the very superficial layer of the wet friction material 1 is heated by one of the laser beam L, the heating plate 21 and the heating roller 11, thereby changing the property of the very superficial layer by heating in a short period of time.

For example, the laser beam L has stable light intensity and is capable of fine and free adjustment of the light intensity. Consequently, the laser beam L can carbonize the resin and fibers existing in the very superficial layer of the wet friction material 1 evenly in a desired thickness. Moreover, it does not use any jig, so that a used apparatus for carbonizing is the same even if the size of the product changes. Consequently, the embodiment can flexibly deal with a variety of size of products and is efficient and economic.

In case of the heating plate 21 and the heating roller 11, it is possible to carbonize the resin and fibers existing in the very superficial layer of the wet friction material 1 evenly in a desired thickness by selecting the contacting time and the contacting pressure.

Each of the above-mentioned embodiments describes the example in which the resin and fibers are evenly carbonized in a desired thickness. However, the inventive wet friction material may be treated so as to change surface property such as quenching and hardening depending on its material.

Thus, it is possible to heat and change the property of the resin and fibers of the very superficial layer of the friction surface including the carbonizing. Consequently, the wet friction material 1 can flexibly deal with a variety of size of products, thereby being efficient and economic.

The wet friction material 1 has carbonized a thickness range of about 15 to 80 $\mu$m from the surface. The carbonized area of about 15 $\mu$m or more is a usable range. If the thickness is smaller than about 35 $\mu$m, the positive $\mu$-V slope characteristic is lowered. If the thickness is smaller than about 15 $\mu$m, it is difficult to put into practice. Where the thickness is larger than about 60 $\mu$m, it is possible that the carbonized layer of the resin and fibers of the very superficial layer of the friction surface is separated from the substrate. If the thickness is larger than about 80 $\mu$m, the carbonized layer of the very superficial layer is flaked off. Therefore, it is preferable to carbonize within the thickness range of about 35 to 60 $\mu$m from the surface so as to keep the portion at which the resin and fibers of the very superficial layer is entangled with the substrate and obtain the positive $\mu$-V slope. Still, it is possible to obtain the wet friction material that has no carbonized layer of the resin and fibers flaked off and that gains the positive $\mu$-V slope by providing the carbonized layer of the resin and fibers within a thickness of about 15 to 80 $\mu$m from the surface.

The preferred embodiments described herein are illustrative and not restrictive, the scope of the invention being indicated in the appended claims and all variations which come within the meaning of the claims are intended to be embraced therein.

What is claimed is:

1. A wet friction material comprising:
   a substrate having a surface; and
   a very superficial layer provided on the surface of the substrate and containing resin and fibers, the resin and the fibers being heated by a heating means to thermally change the very superficial layer, for a period of time so that resin and the fibers of the very superficial layer are carbonized within a range of about 15 to 80 $\mu$m in thickness from a surface of very the superficial layer.

2. A wet friction material comprising according to claim 1, in which the thermal change of the very superficial layer comprises quenching and hardening the very superficial layer within a range of about 15 to 80 $\mu$m in thickness from a surface of the very superficial layer.

3. A wet friction material according to claim 1 in which the heating means comprises a rotating table fixing the wet friction material thereon and rotating at a fixed rotation speed and a laser radiating means for radiating a laser beam onto the surface of the wet friction material fixed on the rotating table, the laser radiating means radiating the laser beam onto entire surface of the wet friction material under a predetermined condition combining the rotation speed of the rotating table with a laser intensity so as to carbonize the very superficial layer of the wet friction material so that the thermal change is performed for a period of time so that the resin and the fibers of the very superficial layer are carbonized within the range of about 15 to 80 µm in the thickness from the surface of the very superficial layer.

4. A wet friction material according to claim 3, in which the thermal change is performed for a period of time so that the resin and the fibers of the very superficial layer are carbonized within the range of about 35 to 60 µm in the thickness from the surface of the very superficial layer, while setting a laser radiating power of the laser radiating means within a range of about 30 to 90% and setting the rotation speed of the rotating table within a range of about 20 to 40 rpm.

5. A wet friction material according to claim 3, in which the thermal change is performed for a period of time so that the resin and the fibers of the very superficial layer are carbonized within the range of about 35 to 60 µm in the thickness from the surface of the very superficial layer.

6. A wet friction material according to claim 3, in which the wet friction material has a positive $\mu$-V slope.

7. A wet friction material according to claim 1, in which the heating means comprises a fixed base accommodating the wet friction material therein and a disc-shaped heating plate having an outside surface heated up to 800 to 1000° C. and pressing the wet friction material housed inside the fixed base with a prescribed pressure for a predetermined period of time, a contacting pressure and a contacting time of the heating plate to the surface of the wet friction material housed inside the fixed base being controlled so that the thermal change is performed for a period of time so that the resin and the fibers of the very superficial layer are carbonized within the range of about 15 to 80 µm in the thickness from the surface of the very superficial layer.

8. A wet friction material according to claim 7, in which the thermal change is performed for a period of time so that the resin and the fibers of the very superficial layer are carbonized within the range of about 35 to 60 µm in the thickness from the surface of the very superficial layer.

9. A wet friction material according to claim 7, in which the wet friction material has a positive $\mu$-V slope.

10. A wet friction material according to claim 1, in which the heating means comprises a heat roller pressing and heating the surface of the wet friction material at a prescribed pressure, a contacting pressure and a contacting time of the heating roller to the surface of the wet friction material being controlled so that the thermal change is performed for a period of time so that the resin and the fibers of the very superficial layer are carbonized within the range of about 15 to 80 µm in the thickness from the surface of the very superficial layer.

11. A wet friction material according to claim 10, in which the thermal change is performed for a period of time so that the resin and the fibers of the very superficial layer are carbonized within the range of about 35 to 60 µm in the thickness from the surface of the very superficial layer.

12. A wet friction material according to claim 10, in which the wet friction material has a positive $\mu$-V slope.

13. A wet friction material according to claim 1, in which the thermal change is performed for a period of time so that the resin and the fibers of the very superficial layer are carbonized within the range of about 35 to 60 µm in the thickness from the surface of the very superficial layer.

14. A wet friction material according to claim 1, in which the wet friction material has a positive $\mu$-V slope.

* * * * *